United States Patent
Raj

(10) Patent No.: US 9,774,396 B2
(45) Date of Patent: *Sep. 26, 2017

(54) USE OF VERY HIGH FREQUENCY SWITCHING POWER CONVERTERS FOR ALSO MODULATING LIGHT OUTPUT FROM SOLID STATE EMITTER TO COMMUNICATE DATA

(71) Applicant: ABL IP HOLDING LLC, Conyers, GA (US)

(72) Inventor: Rashmi Kumar Raj, Centreville, VA (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/184,004

(22) Filed: Jun. 16, 2016

(65) Prior Publication Data

US 2016/0294471 A1 Oct. 6, 2016

Related U.S. Application Data

(63) Continuation of application No. 14/508,356, filed on Oct. 7, 2014, now Pat. No. 9,432,116.

(51) Int. Cl.
*H04B 10/116* (2013.01)
*H05B 33/08* (2006.01)

(52) U.S. Cl.
CPC ....... *H04B 10/116* (2013.01); *H05B 33/0815* (2013.01); *H05B 33/0818* (2013.01); *H05B 33/0845* (2013.01); *H05B 33/0857* (2013.01)

(58) Field of Classification Search
CPC .............. H04B 10/116; H05B 33/0815; H05B 33/0818; H05B 33/0845; H05B 33/0857
USPC ........................................................ 398/118
See application file for complete search history.

(56) References Cited

U.S. PATENT DOCUMENTS

| | | | |
|---|---|---|---|
| 2009/0310973 A1* | 12/2009 | Broyde | H04B 10/1149 398/128 |
| 2010/0102756 A1 | 4/2010 | Shin et al. | |
| 2011/0204820 A1 | 8/2011 | Tikkanen et al. | |

(Continued)

OTHER PUBLICATIONS

Anthony Sagneri, "Design of a Very High Frequency dc-dc Boost Converter," Massachusetts Institute of Technology, Department of Electrical Engineering and Computer Science, Feb. 2, 2007, pp. 1-169.

(Continued)

*Primary Examiner* — Dalzid Singh
(74) *Attorney, Agent, or Firm* — RatnerPrestia

(57) ABSTRACT

An example of a power and modulation circuit utilizes a very high frequency switching power converter to supply drive current power to cause a solid state light source to emit light. The power converter is configured to convert power from a power source to direct current to supply via the output to the light source, at least in part by a switching function of the power converter at a very high frequency rate. The circuit, in such an example, also includes a control circuit coupled to be responsive to input data and control operation of the power converter so that the current output to drive the light source modulates the light emitted from the light source to also carry the input data.

16 Claims, 4 Drawing Sheets

(56) References Cited

U.S. PATENT DOCUMENTS

| | | | |
|---|---|---|---|
| 2012/0069606 A1* | 3/2012 | Sagneri | H02M 3/158 363/21.02 |
| 2012/0086345 A1 | 4/2012 | Tran | |
| 2012/0206943 A1 | 8/2012 | Sagneri et al. | |
| 2013/0015785 A1 | 1/2013 | Kamada | |
| 2014/0178080 A1 | 6/2014 | Chen et al. | |
| 2014/0255038 A1 | 9/2014 | Richards, IV | |
| 2014/0286645 A1 | 9/2014 | Kido et al. | |

OTHER PUBLICATIONS

Robert C. N. Pilawa-Podgurski et al., "Very-High-Frequency Resonant Boost Converters," IEEE Transactions on Power Electronics, vol. 24, No. 6, Jun. 6, 2009, pp. 1654-1665.

Hany Elgala et al., "Reverse polarity optical-OFDM (RPO-OFDM): dimming compatible OFDM for gigabit VLC links," Optics Express, Oct. 7, 2013, Engineering Department, Boston University, Boston, MA, pp. 24288-24299.

Silvia Mioc et al., "Smart Lighting ERC," IAB Meeting, Sep. 26, 2013.

John D. Bullough et al., "Quantifying Stroboscopic Effects from Flickering Light Sources," CORM, Lighting Research Center, Rensselaer Polytechnic Institute, Ottawa, ON, Canada, May 29-Jun. 1, 2012.

Alliance for Solid-State Illumination Systems and Technologies (ASSIST) 2012, "ASSIST recommends . . . Flicker Parameters for Reducing Stroboscopic Effects from Solid-state Lighting Systems," vol. 11, Iss. 1, Troy, NY: Lighting Research Center, May 2012; http://www.lrc.rpi.edu/programs/solidstate/assist/recommends/flicker.asp.

PSIM, "Rapid Control Prototyping," www.powerimtech.com, ECCE 2014, Pittsburgh, Sep. 2014.

Shuzo Zhao et al., "A Dimmable LED Driver for Visible Light Communication (VLC) Based On LLC Resonant DC-DC Converter Operating in Burst Mode", 2013, IEEE Conference Publications, pp. 2144-2150.

Entire prosecution history of U.S. Appl. No. 14/508,356, filed Oct. 7, 2014, entitled "Use of Very High Frequency Switching Power Converters for Also Modulating Light Output From Solid State Emitter to Communicate Data".

* cited by examiner

USE OF VERY HIGH FREQUENCY SWITCHING POWER CONVERTERS FOR ALSO MODULATING LIGHT OUTPUT FROM SOLID STATE EMITTER TO COMMUNICATE DATA

CROSS-REFERENCE TO RELATED APPLICATION

This application is a continuation of U.S. patent application Ser. No. 14/508,356, filed on Oct. 7, 2014, the entire disclosure of which is incorporated herein by reference.

TECHNICAL FIELD

The present subject matter relates to techniques and equipment for light based transmission of data, such as Visual Light Communication (VLC), using a solid state emitter type light source, where the source is driven by a very high frequency switching power converter that is also controlled to modulate the light output from the source in a manner to carry data.

BACKGROUND

Electrical lighting has become commonplace in modern society. Electrical lighting devices are commonly deployed, for example, in homes, buildings of commercial and other enterprise establishments, as well as in various outdoor settings. With the advent of modern electronics has come advancement both in the types of light sources and in the control capabilities within the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors.

The last decade or so has also seen an explosion of demand for data communication services; and increasingly, this demand include demand for wireless connectivity. Cellular and WiFi services are now quite common. However, there have also been proposals to use light-based communication technologies as an alternative to radio-frequency (RF) based wireless communications. Light wave communications, for example, do not interfere with existing RF are not currently subject to regulation or license requirements. Hence, along with the transition to solid state light sources has come an increased interest in using light as an over-the-air mechanism to transport data.

Visual Light Communication (VLC) therefore will likely become a very popular piece of the hybrid network (to increase bandwidth optimization in wireless communication systems). In many cases, the output of a lighting device deployed for a normal lighting purpose, e.g. general white light illumination, is modulated in a manner not readily perceptible by human occupants in the illuminated space but so that the modulated light carries transmitted data.

Traditionally, a switching FET is used either in series or parallel with the LEDs to provide dimming (usually pulse width modulation (PWM)) and high speed switching for VLC to implement the modulation. Those methods tend to be lossy because power is wasted in the FET and almost always requires some storage mechanism in parallel with the load. In another method, the power supply (or LED driver) itself is turned ON and OFF to provide dimming and VLC. In any of these methods, the 'data' signal is added onto the dimming signal. There are limitations with all of these approach since two types of switching cycles have to be super-imposed. One switching cycle is the cycle of the switcher itself, which provides the requisite current regulation; and the other switching cycle is the cycle of 'dimming module,' which requires additional control of LED switching. This can be costly, can be cumbersome, and potentially may create Electromagnetic interference (EMI) issues. These limitations tend to limit the switching speed available for carrying data and result in relative low data transmission rates.

There is still room for further improvement in the technologies used for VLC or other similar types of light-based data communications.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to lighting power and modulation equipment for VLC utilizing very high frequency switching power converters and/or to lighting devices or the like that incorporate such equipment.

Figure 1:
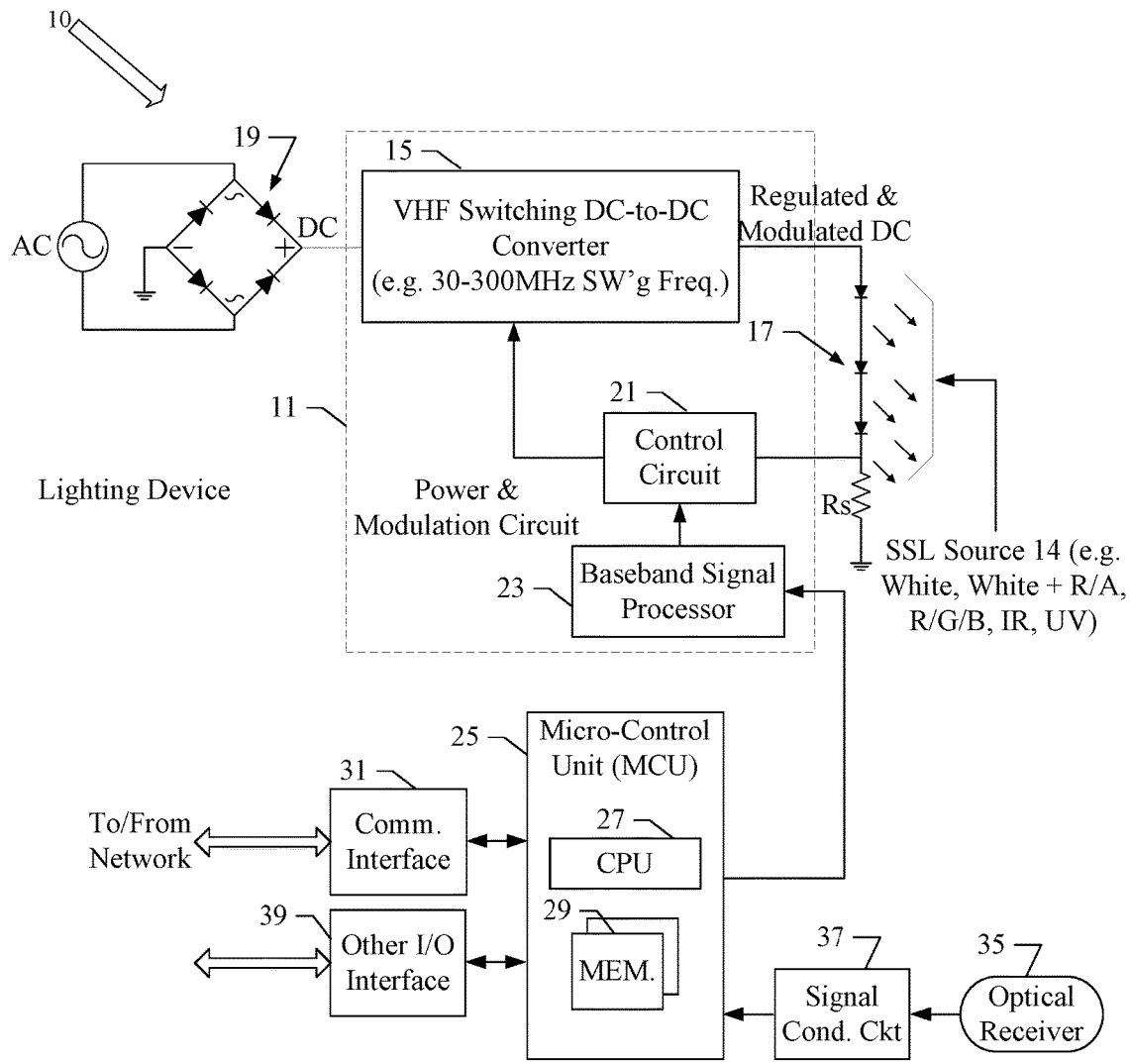
FIG. 1 is a block diagram of a lighting device including a power and modulation circuit utilizing a very high frequency switching power converter.

Reference now is made in detail to the examples illustrated in the accompanying drawings and discussed below. FIG. 1 is a high-level block diagram that illustrates an example of a lighting device 10 that utilizes a SSL type light source 14 for illumination and operates that source 14 so as to also support light based (optical) communication of data. The lighting device 10 in FIG. 1 includes a power and modulation circuit 11 utilizing a very high frequency switching power converter 15.

As noted, the lighting device 10 utilizes a SSL type of light source 14. Although other types of switchable light sources may be used, particularly other types of solid state light emitter(s), in the illustrated example of device 10, the SSL light emitting source includes some number of (one or more) light emitting diodes (LEDs) 17 that together form the SSL type light source 14.

As discussed herein, applicable solid state light emitting elements that may be used alone or in combination to form the SSL source 14 include any of a wide range light emitting or generating devices formed from organic or inorganic semiconductor materials. Examples of solid state light emitting elements include semiconductor laser devices and the like. Many common examples of solid state lighting elements, however, are classified as types of "light emitting diodes" or "LEDs." This example class of solid state light emitting devices encompasses any and all types of semiconductor diode devices that are capable of receiving an electrical signal and producing a responsive output of electromagnetic energy in the range encompassing visible light and adjacent regions such as infrared (IR) and ultraviolet (UV). Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs that contain separately controllable red (R), green (G) and blue (B) LEDs within one package. Other examples of LEDs may include some light conversion material, such as a phosphor and/or nanophosphor, to convert light of wavelength(s) emitted by the actual diode to one or more other wavelengths, for example, so that the LED device produces a broadband output that appears pastel or appears white. Those skilled in the art will recognize that "solid state" or "LED" terminology does not restrict the source to any particular type of package for the LED or other solid state emitter. Such terms encompass solid state devices that may be packaged or non-packaged, chip on board LEDs, surface mount LEDs, and any other configuration of the semiconductor emitter device that emits light.

The color or spectral characteristic of light or other electromagnetic radiant energy relates to the frequency and wavelength of the energy and/or to combinations of frequencies/wavelengths contained within the energy. Many of the examples relate to colors of light within the visible portion of the spectrum, although examples also are discussed that utilize or emit light energy in other spectral ranges.

The example of a lighting device 10 shown in FIG. 1 utilizes a group of LEDs 17 as the SSL light source 14 and utilizes a single power converter and modulator circuit 11 to drive that source 14. The LEDs 17 forming the SSL source 14 may be connected in parallel, in series or in series-parallel combinations; although in the illustrated example, the LEDs 17 are connected together in a single series string.

In a typical general lighting application the LEDs 17 included in the string together produce white light of a desirable color characteristic. For example, the LEDs 17 may all be white (W) LEDs. As an alternate example, configured to produce a somewhat 'warmer' white light, some of the LEDs 17 may be white (W) whereas other LEDs 17 in the string may be another color such as red (R) and/or amber (A). In such white light examples, the LEDs 17 forming the SSL source 14 together provide a broadband visible light output for the general white lighting application, and the circuit 11 supplies driver current and modulates the broadband light output to also carry the data.

The light generation and modulation technologies discussed herein are also applicable to more narrowband carriers produced by relatively monochromatic solid state devices. In a simple example, the lighting device 10 of FIG. 1 might use narrowband LEDs of one color in the SSL source 14, e.g. all red (R), all green (G) or all blue (B).

In most cases, the broadband or narrowband light is in the visible spectrum, however, the present technologies may also be applied in devices that use IR for communication and/or UV (e.g. for communication or to pump phosphor(s) for visible light communication). In a general lighting application where the LEDs do not provide white light (e.g. use R, G, B, UV or IR for data communication), the device 10 could be combined with a separate white light source (not shown) that need not be modulated. Relatively narrowband/ 'monochromatic' LEDs may utilize the technology better for the higher datarates that broadband LEDs. The phosphor in white LEDs might have persistence which could be longer than the time scale at the high datarate; in which case, colored (or narrow-band) LEDs might work better since they do not have phosphor. A modulated narrowband source, however, may still be part of a broadband lighting device. For example, in a tunable red (R), green (G), blue (B) type lighting device that can provide combined tunable white output, the modulated source may be any one of the three (R, G or B) light sources, although only one such source is shown in FIG. 1. As another example, in a tunable white solid state lighting device, the white channel/source (not shown) may be un-modulated, and another tuning channel may have a narrowband source as shown that is then modulated as discussed herein relative to FIG. 1.

Returning more specifically to the example of FIG. 1, the very high frequency switching power converter 15 has an output connected to supply current to drive the LEDs 17 forming the solid state light emitting source 14 to emit light. The very high frequency switching power converter 15 has an input coupled to a source of power. The power source could be a direct current (DC) source, such as a battery. In the example, the device 10 obtains power from alternating current (AC) source at normal line voltage (e.g. around 120V in the US). Although not shown, one or more protective fuses may be provided in the line connection(s). The very high frequency switching power converter 15 connects to the rectified DC output side of a bridge rectifier 19 formed by four bridge connected diodes. Although not shown, some additional smoothing and/or control circuitry may be provided on the power input side, between the bridge rectifier 19 and the very high frequency switching power converter 15.

The power converter 15 is the switcher of a switched-mode power supply (SMPS) for converting the DC from the bridge rectifier 19 and supplying DC current to the LEDs 17 of the SSL source 14. Hence, the example implements the converter 15 as a DC-to-DC converter. Depending on the application, e.g. the number of LEDs used to provide the desired maximum light output level and the power requirements of that number of LEDs, the power converter 15 may utilize any appropriate power converter topology (e.g. boost, buck, fly back, etc.), albeit configured to operate at a VHF switching rate, as discussed more fully below. In at least some examples, the VHF converter may be a resonant converter.

The modulation and VLC communications techniques discussed herein may use a variety of different types of VHF converters, although some types may provide better performance than others. Hence, it may be helpful to some readers to consider some general information about DC-to-DC converters and then discuss some types that may offer particular advantages in SSL lighting.

At sufficiently high converter switching frequencies (>1 MHz), transistor losses become sufficiently large that the loss negates the advantages in reducing inductor sizes. Adding snubbers (e.g. resistor, capacitor diode or "RCD") does not solve the problem since snubber usage only shifts the losses to RCD component which becomes useless above 200 KHz. To operate at frequencies higher than that, transistor switching losses at Turn ON and Turn OFF must be reduced. This is achieved by resonant converters by associating a resonating LC (inductance, capacitance) circuit with the switching transistor, to render its current sinusoidal rather a square wave in shape. The converter is then arranged to turn the transistor on and off at the zero crossings of the current in the sine wave. There is thus no overlapping of falling current and rising voltage at Turn OFF and rising current and falling voltage at Turn ON and hence no switching losses. This is called Zero Current Switching (ZCS). In addition, even if this loss was eliminated, there is a huge output capacitance associated with the switching MOSFET. Circuits that deal with this are called Zero Voltage Switching (ZVS). ZVS circuits work to ensure that the transistor output capacitance is made so that transistor capacitor is resonant in an LC circuit (the MOSFET's capacitance being the C). Then the voltage or energy stored in the capacitance when the transistor is OFF is changed to the stored current or energy of the inductor in the resonant circuit. Then later in the cycle, this energy is returned without loss to the power bus. Hence, VHF converters typically have resonant topologies. Class Phi ($\Phi$) inverters use the first several harmonics; and more specifically a class Phi2 ($\Phi_2$) inverter is tuned for the first 3 harmonics.

The VHF converter used in a particular example of the circuits and lighting devices discussed herein is referred to as the $\Phi_2$ converter, which includes or is implanted as a Phi2 ($\Phi_2$) inverter tuned for the first 3 harmonics. The Phi2 ($\Phi_2$) class converter offers different performance from other VHF converters in that the $\Phi_2$ converter can maintain high load efficiency across the entire range of load. This may be particularly advantageous when data is modulated on the load, it forces the load to change between levels. So, using any other type of VHF converter (such as a class E or type $\Phi$ converter) would not be as advantageous since the losses would be very high.

The DC-to-DC converter includes an internal clock used to drive the actual switch(es) of the convert. All DC-to-DC converters have a 'controller' which include this internal clock. In this case, the internal controller is part of the VHF power converter 15. As an example, by changing the clock speed, it is possible to speed up the switching speed, which would affects the VLC modulation rate.

The power converter 15 therefore is configured to convert power from the source of power to direct current to supply via the output to the solid state light emitting source 14, at least in part by a switching function of the power converter at a very high frequency rate. The VHF switching function, in our examples, switches at a frequency in the range of about 30 MHz (30 MHZ±3 MHz) to about 300 MHz (300 MHz±30 MHz). Some examples are optimized for a switching frequency at or above 200 MHz.

A switcher used as the very high frequency (VHF) switching converter, having a switching frequency in the ranges outlined above, can provide load switching, perhaps between 100% to 20%, at a frequency of at least 50 MHz (assuming current mode control and a high bandwidth loop). Such a frequency range used with relatively simple modulation techniques, for example, should be able to provide a data stream of up to at least 10 Mbps for light-based over-the-air data communication. Higher data rates for VLC or other optical transmissions may be possible with higher baud rate modulation encoding techniques.

Although other connection arrangements may be used, in the example, the output of the very high frequency switching power converter 15 provides the DC voltage and current to the anode side of LEDs 17 in the lighting device 10, to drive the LEDs 17 to emit light at a desired illumination level and modulated to carry data. In the device 10, the power and modulation circuit 11 also includes a control circuit 21 coupled to respond to input data and coupled to the power converter 15, to control at least one parameter of operation of the very high frequency power converter 15 and thus the current output from the power converter 15 to drive the solid state light emitting source 14, such that light emitted from the solid state light emitting source is modulated to carry the input data.

As used herein direct current or DC refers to current that does not swing between positive and negative (does not pass through 0 or neutral). The output of the bridge rectifier 19, for example, is a half-wave rectified current, and we will consider that DC although there is still extensive variation between peaks and 0. The output of a switcher-based DC-to-DC converter will be relatively constant DC but will still include some ripple. In the device 10 of FIG. 1, the output of the VHF converter 15 can be considered DC for all intents and purposes (even though it is not the same output as from a battery). The converter output will have a ripple at VHF frequencies. For the data transmission application, the DC output of the VHF converter 15 will also be modulated in one of several ways to carry the data that is being transmitted via the LED light output.

A variety of strategies/technologies may be used to provide the illumination level control as well as the current and light modulation to transmit the data over the output light. The example includes a sense resistor (Rs) in series with the SSL source 14, and the control circuit 21 includes a comparator (not separately shown) to compare an input signal from a baseband signal processor 23 to the voltage across the sense resistor (Rs) to produce and appropriate control voltage as a feedback signal input to the very high frequency switching power converter 15. The baseband signal processor 23 is responsive to input data to provide a baseband signal representing the data as an input to the control circuit. Although separate illumination level control may be provided, in the example the baseband signal processor 23 also adjusts the signal provided to the control circuit 21 so that the very high frequency switching power converter 15 achieves and maintains an output current level to drive the SSL source 14 to provide the desired overall illumination level as well as to modulate the light output to carry the data.

The lighting device 10 may implement a variety of overall host control/operation technologies that provide the high level logic to control operation of the device including data transmission. As lighting devices become increasingly intelligent and 'connected,' such devices utilize ever more sophisticated controllers. The trend in intelligent lighting devices is to utilize programmable processors to implement the host control and communication logic. Although processor based lighting devices may use microprocessors similar to those in computers or mobile devices, the illustrated example of device 10 uses a micro-control unit (MCU) 25, sometimes referred to as a microcontroller.

The MCU 25 implements the control logic for the device 10, that is to say, controls operations of the device 10 based on execution of its embedded 'firmware' instructions. The MCU 25 may be a microchip device that incorporates a processor serving as the programmable central processing unit (CPU) 27 of the MCU and thus of the lighting device 10 as well as one or more memories 29 accessible to the CPU 27. The memory or memories 29 store the executable programming for the CPU 27 as well as data for processing by or resulting from processing of the CPU 27. The memory or memories 29, for example, may store illumination level settings and/or may temporarily store data the device is sending or receiving via VLC. The MCU 25 may be thought of as a small computer or computer like device formed on a single chip. Such devices are often used as the configurable control elements embedded in special purpose devices rather than in a computer or other general purpose device. A variety of PIC16 and PIC32 type MCU chips, for example, may be used as the MCU 25 in the lighting device 10.

The lighting device 10 also includes a communication interface 31 coupled to a communication port of the MCU 25. The interface 31 provides a communication link to a telecommunications network that enables the MCU 25 to send and receive digital data communications through the particular network. The network may be wired (e.g. metallic or optical fiber), wireless (e.g. radio frequency or free space optical) or a combination of such network technologies; and the interface 31 in a particular installation of the device 10 will correspond to the most advantageous network available (based on considerations such as cost and bandwidth) at the location of the installation. For example, if the network is a particular type of local area network (LAN), the communication interface is of a type for linking to and communication through the available type of LAN. The communication interface 31 is therefore accessible by the processor/CPU 27 of the MCU 23, and the communication interface 31 is configured to enable the processor to communicate information about its operations as wells as data sent or received as VLC communication through the LAN or other communications network.

Data sent and received via the interface 31 may relate to lighting operations, e.g. to report device status to some other equipment and/or to receive commands and/or setting data to control light output, for example, to turn the light output ON to a particular overall intensity level. In the example, however, the network and the interface 31 also enable the device 10 to receive data for VLC transmission to a device in the space illuminated by light output from the SSL source 14.

Although the device 10 could provide one-way data transmission, for purposes of the present example, the device 10 is also capable of receiving data via VLC transmission from a device in the illuminated space. Hence, the device 10 also includes an optical receiver 35, for example, including one or more photodiodes to receive light; and a signal conditioning circuit 37 processes the receiver output signal to recapture (e.g. demodulate the signal to obtain) data carried on the received light. Such received data is provided to the MCU 25 for processing and forwarding via the interface 31 for communication over the network.

The lighting device may also include an additional input/output (I/O) interface 39, for communication between the MCU 25 and another local device, such as a local user interface device.

Returning now more specifically to the discussion of VLC over-the-air data communication, the device 10 typically receives data for VLC transmission via the network and the communication interface 31 and supplies the data to the MCU 25. The MCU 25 may also generate some signaling data or the like locally for communication via VLC to the other device. The MCU 25 provides level setting commands to the baseband signal processor 23. The MCU 25 may also instruct the baseband signal processor 23 as to the appropriate modulation format, and the MCU 25 supplies the received data to the baseband signal processor 23. The baseband signal processor 23 responds to these inputs from the MCU 25 to generate a signal for input to the control circuit 21. Using the voltage across the sense resistor (Rs), the circuit generates a signal to set the output current from the very high frequency switching power converter 15 to the intended level for the desired illumination intensity, albeit with the drive current and thus the light output modulated as instructed so as to carry the data over the air.

Figure 2:
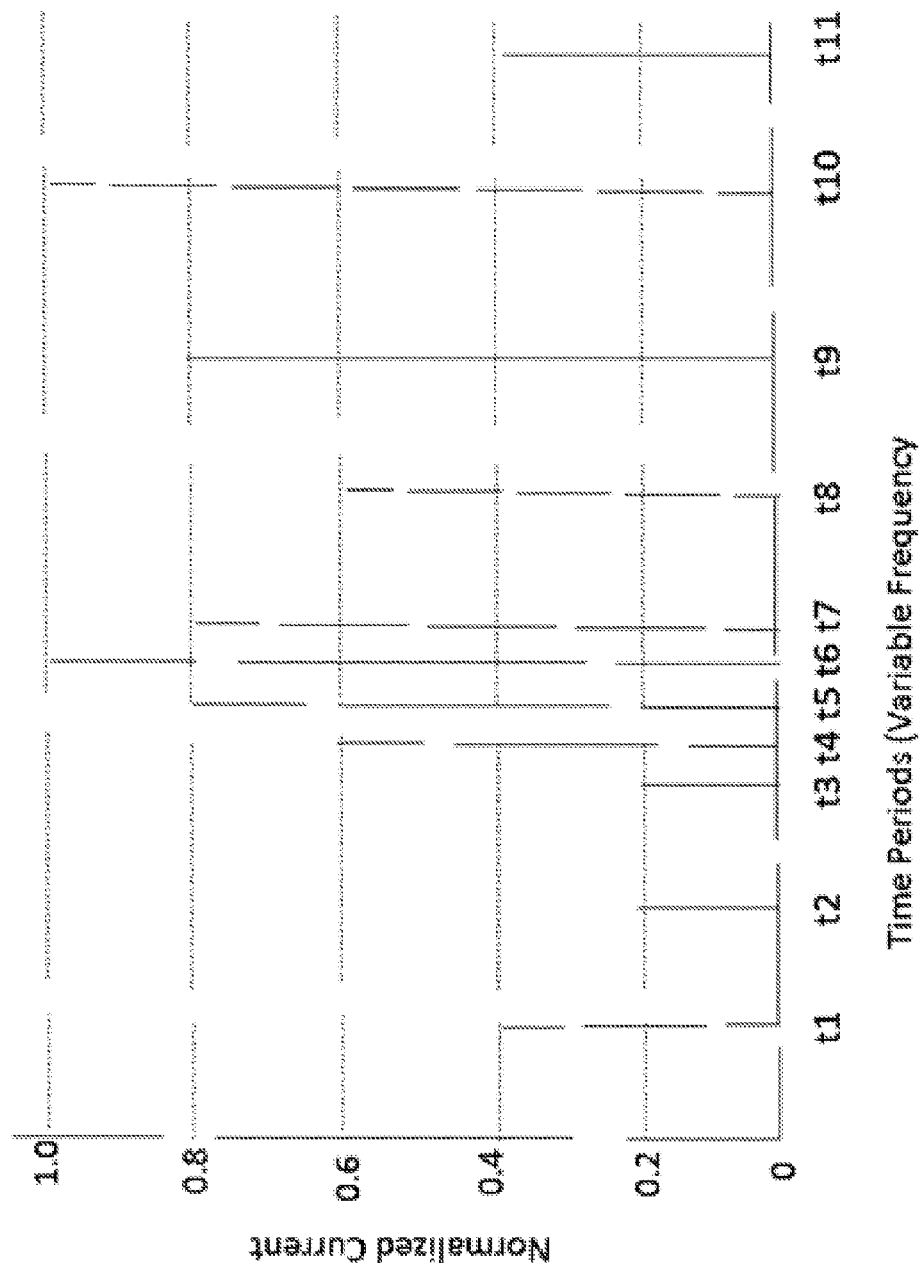
FIG. 2 is a chart of an example of varying current at varying frequencies, for a VLC application.

With the VHF switcher approach to DC-to-DC conversion and data modulation, the problems outlined earlier may be mitigated since the switcher itself is switching so fast. The dimming profile (which corresponds to the switching between different load current at a fixed or variable frequency) can be inherently controlled by the switcher. One can imagine doing all sorts of things with the load profile. For example, in the graph of FIG. 2, there are varying current levels and varying frequencies, which creates a spread spectrum effect. By way of example, FIG. 2 depicts three possible variations in the output of the VHF converter. The output current can change in magnitude. The output current can also vary in frequency and/or duty cycle. So, the graphs represents the profile of the output current. Corresponding instructions would be provided by the baseband processor. By using a combination of such modulation schemes, the VLC designer now has the freedom to use any type of communication scheme. So, this type of an output profile can then manage dimming and also provide modulation for high bandwidth optical communication. Somewhat traditional multiplexing (such as orthogonal frequency-division multiplexing (OFDM)) or non-traditional keying (such as reverse polarity orthogonal frequency-division multiplexing (RP-OFDM) can be used.

Flicker is of great concern in design and manufacture of SSL lighting. Since the DC-to-DC converters used in the examples operate at such high switching frequencies, a designer using a lighting device incorporating such a converter would not have to worry about flicker switching and modulation will occur at such high frequencies. Variations in the light output below about 10 kHz cause a stroboscopic effect on humans that in some cases may produce adverse medical effects. It is desirable for any variation in the light output to take a form, e.g. in magnitude and/or frequency that unobjectionable/harmless to humans. The VHF switcher approach discussed herein produces unobjectionable/harmless modulation of the light output of the device.

The very high frequency switching power converter 15 offers high efficiency at the entire load range; and as result, these drivers are compact and have ultra-high power densities. One can envision such a design as being particularly suited for on-board drivers, which means integrating the driver electronics with the LEDs on the circuit board in many types of LED lighting products. Such an on-board integration approach will reduce overall cost for electronics, for example, in RGB and tunable white type drivers, e.g. by reducing board count and hence increases mean time between failures (MTBF).

The input data signal provided to the VHF converter 15 will affect the DC output of the converter 15, and thus the light output from the SSL source 14. Data can be embedded in a variety of different ways. FIGS. 3A to 3E are diagrams of examples of variable waveforms for different schemes for modulation of the light output to carry data.

Figure 3A:
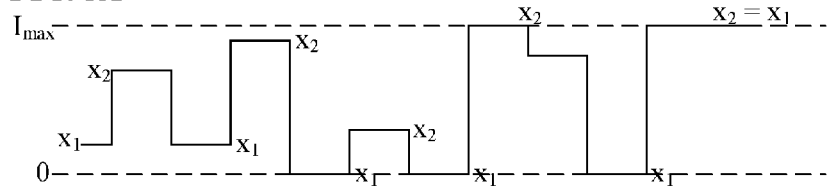
FIGS. 3A to 3E are diagrams of examples of variable waveforms for different types of modulations of the light output to carry data.

FIG. 3A, for example, shows a modulation scheme in which one or more current levels represent data. As shown, the load is switched from a variable low current level $x_1$ to a variable high current level $x_2$. Each value $x_1$, $x_2$ may vary between 0 and the maximum current level ($I_{max}$) of the converter output, for the particular configuration on the converter 15 in the device 10. For each cycle of the waveform, the value of one or both of $x_1$, $x_2$ may represent a data value. If $x_1=x_2$, the load presented by the SSL source 14 is ON at the instantaneous value of $x_1$ (or $x_2$) amps. If $x_1 < x_2$, the load presented by the SSL source 14 will be switching between current levels $x_1$ and $x_2$.

In other scenarios, $x_1$ can vary but $x_2$ is fixed, or $x_2$ can vary but $x_1$ is fixed. In either of these modulation schemes, the load presented by the SSL source 14 will be switching between the variable and fixed current levels, and the level of the variable at a particular time or point on the waveform represents the data value.

Figure 3B:
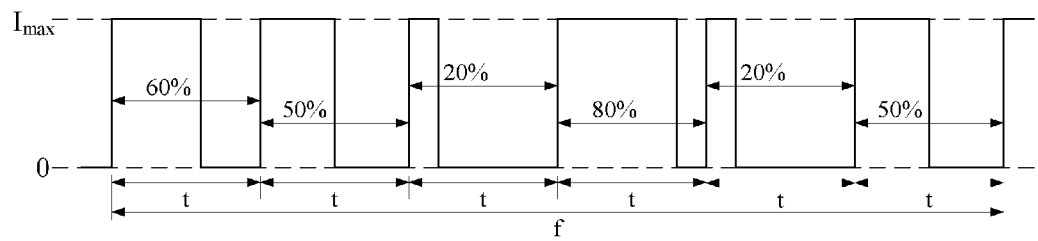

FIG. 3B illustrates an example of a modulation scheme in which the input data signal may request the VHF converter 15 to output a variable current, having a fixed frequency but a variable duty cycle. Variations in the duty cycle of the otherwise fixed frequency output of the converter 15 and thus the SSL light source 14 carries the data. For simplicity, the drawing shows only a few cycles of the modulation. The first cycle/waveform exhibits a 60% duty cycle (ON for 60% of the overall cycle/waveform, OFF for the other 40% of the overall cycle/waveform). The second cycle/waveform exhibits a 50% duty cycle, whereas the third cycle/waveform exhibits a 20% duty cycle. The fourth cycle/waveform exhibits an 80% duty cycle, whereas the fifth cycle/waveform exhibits a 20% duty cycle, and the sixth cycle/waveform exhibits a 50% duty cycle. The different duty cycles represent different data values. The load current goes in incremental steps between 0% and 100%, albeit in different cycles. This approach embeds data (or information) in varying lengths of the ON/OFF portions forming the duty cycle of one or more waveforms of the fixed frequency current/light outputs.

Figure 3C:
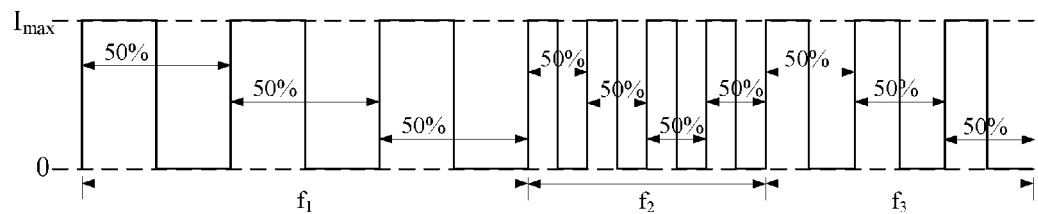

In the further example of FIG. 3C, the input data signal may request the VHF converter 15 to output a variable current, having a fixed duty cycle but variable frequency, where in the frequency variations represent different data values, thus embedding the data in the frequency modulation. Hence, the modulation waveform of FIG. 3 shows some number of cycles at each of three different frequencies $f_1$, $f_2$, $f_3$. For all of the different frequencies, the duty cycles are the same. Although 50% duty cycle is shown for convenience, a VLC modulation technique of this type may use a higher or lower percentage duty cycle.

It should be apparent that modulation schemes may be combined to increase the data transmission rate. It may be helpful to consider a couple of examples of combining two or more of the modulation techniques discussed above.

Figure 3D:
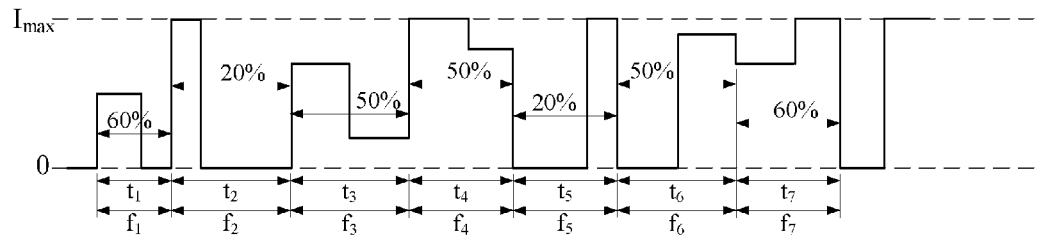

FIG. 3D, for example, represents a modulation scheme that combines amplitude modulation (varying the load current supplied by the VHF converter 15) like that of FIG. 3A with duty cycle modulation like that of FIG. 3B and frequency modulation like that of FIG. 3C. As shown, the length of time t and thus the frequency varies from cycle to cycle of the waveform, based on some of the data to be transported. Also, the percentage duty cycle varies from cycle to cycle of the waveform, based on some of the data to be transported. Differences in the high and low levels of each cycle of the waveform also represent other information from the data that the device is transmitting via VLC.

Figure 3E:
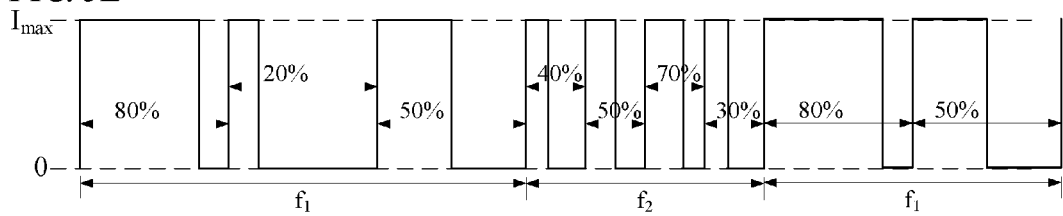

FIG. 3E represents a simplified example of a waveform that might result from combining the duty cycle and frequency modulation schemes of FIGS. 3B and 3C.

Increasing the number of waveform parameters that change based on the input data signal, increases the amount of data that can be carried on each cycle of the waveform and thus the number of bits of data represented by each symbol transmitted by the modulated current signal and thus the VLC output light, which in turn increases the baud rate and overall data transmission rate.

Although the examples above mostly focused on modulation of visible light to carry the data, those skilled in the art will appreciate that the same technique can be used to transmit data over light wavelengths in other spectral regions, for example, on infrared (IR) or ultraviolet (UV) light wavelengths. For example, if the device 10 where not itself intended to emit visible light itself, the 10 would use LEDs 11 of a type configured to emit IR or UV light.

The examples discussed so far have assumed a single light communication channel, i.e. transmission of data by modulation of the light output from a single switchable SSL source 14 (via a single converter 15). The present technologies, however, are also applicable to multi-channel data transmission.

Figure 4:
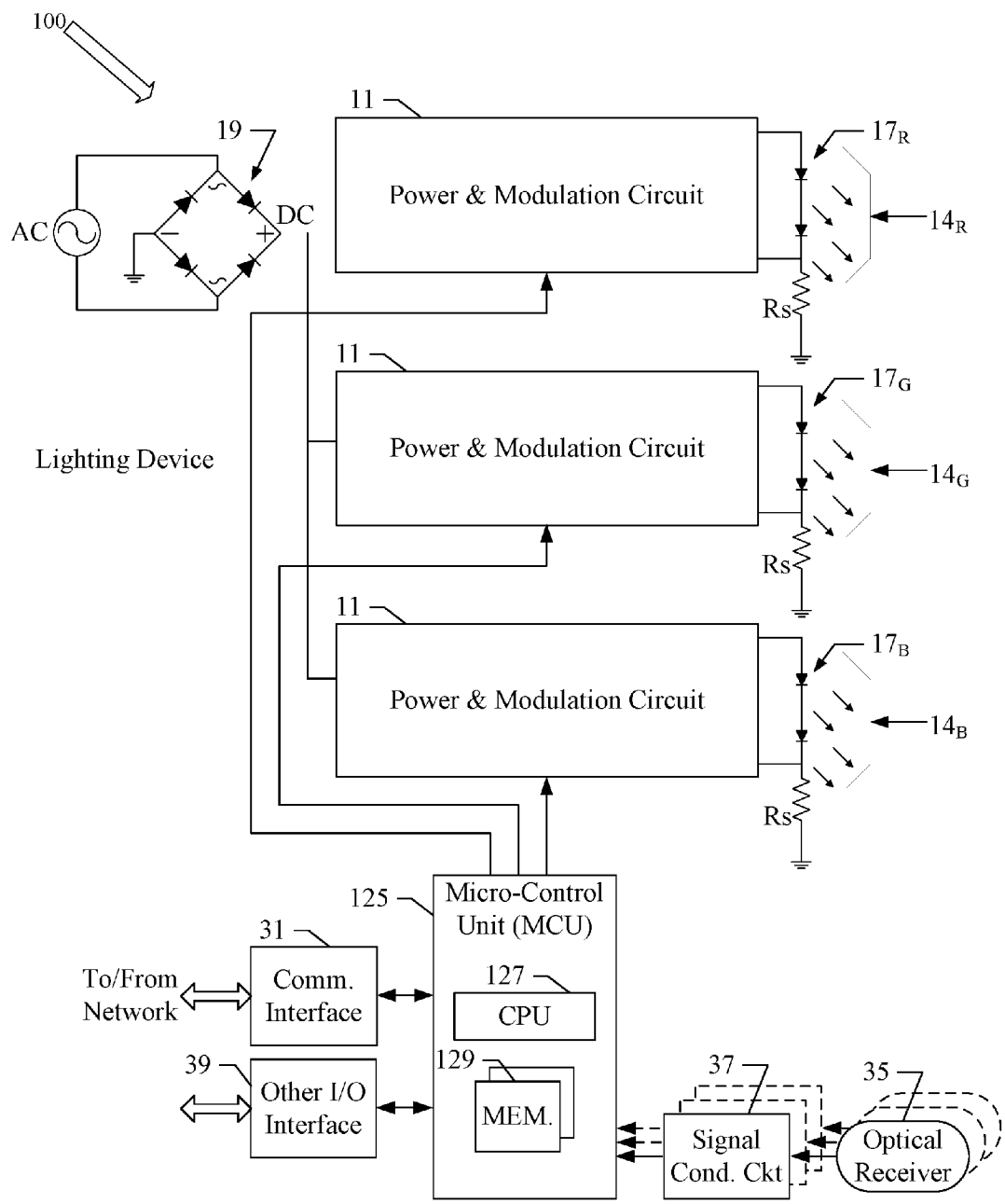
FIG. 4 is a block diagram of a three-channel lighting device, where each channel may include a power and modulation circuit utilizing a very high frequency switching power converter.

FIG. 4, for example, is a high-level block diagram that illustrates an example of a lighting device 100 that utilizes light sources of different color characteristics. In this example, the device includes three separately controllable sources, specifically a red (R) source $14_R$, a green (G) source $14_G$ and a blue (B) source $14_B$. Adjustment of the outputs of the sources $14_R$, $14_G$, $14_B$ can provide tunable illumination. Individual modulation of the outputs of any or of the outputs of the sources source $14_R$, $14_G$, $14_B$ can also support light based transmission of data on up to three different light wavelength bands.

The lighting device 100 utilizes SSL type of light sources. Although other types of switchable light sources may be used, particularly other types of solid state light emitter(s), in the illustrated example of device 100 each of the SSL light emitting sources includes some number of (one or more) light emitting diodes (LEDs) 17 that together form the respective SSL type light source 14. Hence, each source $14_R$, $14_G$, $14_B$ includes a group of LEDs of a corresponding color, in this example, red (R) LEDs $17_R$, green (G) LEDs $17_G$, and blue (B) LEDs $17_B$. Similar to the LEDs 17 of FIG. 1, each group of colored LEDs $17_R$, $17_G$, or $17_B$ may be connected in parallel, in series or in any viable series-parallel combination; although in the illustrated example, each respective group of colored LEDs $17_R$, $17_G$, or $17_B$ is connected together in a single series string.

The lighting device 100 in FIG. 4 includes a power and modulation circuit 11 as the drive and control channel for each light output channel provided by the different color sources $14_R$, $14_G$, $14_B$. Although not separately shown in FIG. 4 for convenience, each power and modulation circuit 11 includes a very high frequency switching power converter 15, such as a Phi2 ($\Phi_2$) class converter.

Although there may be differences, in the example, all three circuits 11 are the same, and each circuit 11 may be the same or similar to the circuit 11 of FIG. 1. For example, for each group of colored LEDs $17_R$, $17_G$, or $17_B$ forming a colored SSL source $14_R$, $14_G$, or $14_B$, the corresponding circuit 11 includes a very high frequency switching power converter 15. For example, in the device 100, the very high frequency switching power converter 15 (FIG. 1) in each power and modulation circuit 11 (FIG. 4) has an output connected to supply current to drive the LEDs $17_R$, $17_G$, or $17_B$ forming the respective solid state light emitting source $14_R$, $14_G$, or $14_B$, to emit modulated light of the respective color. The very high frequency switching power converter 15 in each power and modulation circuit 11 has an input coupled to a source of power.

Again, the power source could be a direct current (DC) source, such as a battery; but in the example, the device 100 obtains power from alternating current (AC) source at normal line voltage (e.g. around 120V in the US). Although not shown, one or more protective fuses may be provided in the line connection(s). The very high frequency switching power converter 15 in each power and modulation circuit 11 connects to the rectified DC output side of a bridge rectifier 19 formed by four bridge connected diodes. Although not shown, some additional smoothing and/or control circuitry may be provided on the power input side, between the bridge rectifier 19 and the very high frequency switching power converters in the power and modulation circuits 11.

Each VHF power converter is the switcher of a switched-mode power supply (SMPS) for converting the DC from the bridge rectifier 19 and supplying DC current to the respective set of LEDs $17_R$, $17_G$, or $17_B$, both for a portion of the illumination and for modulation to carry one channel of the data transmission. In this example, the device 100 implements each VHF converter as a DC-to-DC converter. Depending on the application, e.g. the number of LEDs used to provide the desired maximum light output level in the respective channel and the power requirements of that number of LEDs, each VHF power converter may utilize any appropriate power converter topology (e.g. boost, buck, fly back, etc.), albeit configured to operate at a VHF switching rate, as discussed herein.

In this example, each power converter in a circuit 11 is configured to convert power from the source of power to direct current to supply via the output to the respective solid state light emitting source, at least in part by a switching function of the power converter at a very high frequency rate. Again, the VHF switching function, in our examples, switches at a frequency in the range of about 30 MHz (30 MHZ±3 MHz) to about 300 MHz (300 MHz±30 MHz). Some examples are optimized for a switching frequency at or above 200 MHz.

Although not separately shown, each power and modulation circuit 11 includes a control circuit and possibly a baseband processor, similar to the control circuit 21 and the baseband processor 23, to control operation of the VHF power converter 15 to set the overall output level (dimming control) and modulate the current and thus the light output of the respective colored LEDs $17_R$, $17_G$, or $17_B$ forming the solid state light emitting source $14_R$, $14_G$, or $14_B$. Although any of the three channels/sources may be used to carry data, or any two of the channels/sources; in the example, all three of the channels/sources may carry modulated data transmissions similar to those provided by the single channel/source in the example of FIG. 1. Hence, in our example, each power and modulation circuit 11 receives a separate independently controllable input signal from a MCU.

As in the earlier example, the lighting device 100 may implement a variety of overall host control/operation technologies that provide the high level logic to control operation of the device including data transmission; although the illustrated example uses a MCU 125. The MCU 125 implements the control logic for the device 100, that is to say, controls operations of the device 100 based on execution of its embedded 'firmware' instructions. The MCU 125 may be a microchip device that incorporates a processor serving as the programmable central processing unit (CPU) 127 of the MCU and thus of the lighting device 100 as well as one or more memories 129 accessible to the CPU 127. The memory or memories 129 store the executable programming for the CPU 127 as well as data for processing by or resulting from processing of the CPU 127. The MCU 125 is similar to the MCU 25 of FIG. 1, except that the MCU 125 has three outputs to independently provide the control and data signals to the three power and modulation circuits 11. The three outputs may be individual output ports or a single port with signals addressed to the different baseband processors.

Similar to the earlier example, the lighting device 100 also includes a communication interface 31 coupled to a communication port of the MCU 125. The interface 31 provides a communication link to a telecommunications network that enables the MCU 125 to send and receive digital data communications through the particular network. The communication interface 31 is therefore accessible by the processor/CPU 127 of the MCU 123, and the communication interface 31 is configured to enable the processor to communicate information about its operations as wells as data sent or received as VLC communication on any of the three light channels through the LAN or other communications network.

Although the device 100 could provide one-way data transmission, for purposes of the present example, the device 100 is also capable of receiving data via VLC transmission from a device in the illuminated space. Hence, the device 100 also includes an optical receiver 35, for example, including one or more photodiodes to receive light; and a signal conditioning circuit 37 processes the receiver output signal to recapture (e.g. demodulate the signal to obtain) data carried on the received light. Such received data is provided to the MCU 125 for processing and forwarding via the interface 31 for communication over the network. As represented by the dotted lines in the drawing, the device 100 may include one or more additional sets of receivers 35 and signal conditioning circuits 37 (e.g. sensitive to wavelengths in different bands) for additional upstream channels of VLC light reception.

The lighting device 100 may also include an additional input/output (I/O) interface 39, for communication between the MCU 125 and another local device, such as a local user interface device.

Returning now more specifically to the discussion of VLC over-the-air data communication, the device 100 receives data for VLC transmission via the network and the communication interface 31 and supplies the data to the MCU 125. The MCU 25 may also generate some signaling data or the like locally for communication via VLC to the other device(s). The MCU 125 identifies data for transmission over each of the three output light channels R, G or B. For each such channel, the MCU 125 provides level setting commands to the baseband signal processor in the respective power and modulation circuit 11. The MCU 125 may also instruct the baseband signal processor as to the appropriate modulation format, and the MCU 125 supplies the received data to the baseband signal processor.

Each baseband signal processor in a respective power and modulation circuit 11 responds to these inputs from the MCU 125 to generate a signal for input to the associated control circuit; and the control circuit generates a signal to set the output current from the very high frequency switching power converter in the power and modulation circuit 11 to the intended level for the desired illumination intensity for the respective channel R. G or B, albeit with the drive current and thus the light output modulated as instructed so as to carry the data routed to that channel via the over the air light transmission.

Each channel may implement any of the light modulation schemes discussed by way of examples earlier to transmit the data via the light output of the respective colored LEDs $17_R$, $17_G$, or $17_B$ forming the solid state light emitting source $14_R$, $14_G$, or $14_B$. All three channels may use the same modulation scheme, or one or more of the channels may use different modulation schemes. Modulation schemes, for example, may be dynamically adjusted for one or more of the channels based on performance, e.g. in response to feedback from devise receiving the VLC data transmissions. Different downstream transmission channels on different wavelength channels may be assigned for transmissions to different devices in the illuminated space; or two or more such transmission channels may be used to provide a combined higher rate transmission for one device or intended for common reception by a number of devices in the illuminated space (e.g. broadband broadcast).

The use of VHF converters to provide drive current modulation for VLC communication, as described herein, will be amenable to a variety of modifications and adaptations to particular lighting and/or communication applications. The technology also offers a number of advantages over prior approaches to VLC, some of which have been outlined above. In particular, use of Φ2 inverters which are a type of VHF converters, is of interest because such converters lend themselves to VLC application, compared to other VHF converters (for example Class E of Class Φ converters), since the Φ2 inverters are designed to provide high efficiency across the entire load range (5%-100% load can be 80% efficient through the range). This is particularly advantageous when a lighting device modulates the optical output because it does not make the lighting application suffer in efficiency due to changing load current. The load current might have to travel from 0% to 100% depending on the type of modulation used for data transmission.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A device, comprising:
   a solid state light emitting source;
   a very high frequency switching power converter, having an output connected to supply current to drive the solid state light emitting source to emit light on a channel and being configured to be coupled to a source of power,
   the power converter being further configured to convert power from the source of power to direct current to supply via the output to the solid state light emitting source, at least in part by a switching function of the power converter at a very high frequency rate; and
   a control circuit coupled to the power converter and responsive to input data, to control at least one parameter of operation of the very high frequency power converter and thus current output from the power converter to drive the solid state light emitting source on the channel, to switch the current output to drive the solid state light emitting source at a frequency in a range of 30 MHz to 300 MHz and to modulate switched light output from the solid state light emitting source to carry the input data at a rate above 10 Mbps and up to 150 Mbps on the channel for light-based over-the-air data communication.

2. The device of claim 1, wherein the solid state light emitting source comprises one or more light emitting diodes each configured to emit light in a narrow spectral band in or near the visible light spectrum.

3. The device of claim 1, wherein the solid state light emitting source comprises one or more light emitting diodes each configured to emit broadband visible light.

4. The device of claim 1, wherein the control circuit and the very high frequency switching power converter are configured such that modulation of the light emitted from the solid state light emitting source is unobjectionable/harmless to humans.

5. The device of claim 1, wherein the very high frequency switching power converter is a Phi2 ($\Phi_2$) class converter configured for very high frequency operation.

6. The device of claim 1, further comprising a baseband signal processor responsive to the input data to provide a baseband signal representing the data as an input to the control circuit.

7. An apparatus, comprising:
   a very high frequency switching power converter on a first channel of a plurality of channels, having an input for connection to receive power from a power source and an output for connection to a switchable light source, to supply drive current power to cause the switchable light source to emit light on the first, channel,
   the power converter being configured to convert power from the power source to direct current to supply via the output to the switchable light source, at least in part by a switching function of the power converter at a very high frequency rate; and
   a control circuit coupled to the power converter and responsive to input data, to control at least one parameter of operation of the very high frequency power converter and thus current output from the power converter to drive the switchable light source on the first channel, to switch the current output to drive the switchable light source at a frequency in a range of 30 MHz to 300 MHz and to modulate switched light output from the switchable light source on the first channel to carry the input data at a rate above 10 Mbps and up to 150 Mbps on the first channel for light-based over-the-air data communication.

8. The apparatus of claim 7, wherein the switchable light source comprises one or more light emitting diodes each configured to emit light in a narrow spectral band in or near the visible light spectrum.

9. The apparatus of claim 7, wherein the switchable light source comprises one or more light emitting diodes each configured to emit broadband visible light.

10. The apparatus of claim 7, wherein the control circuit and the very high frequency switching power converter are configured such that modulation of the light emitted from the switchable light source is unobjectionable/harmless to humans.

11. The apparatus of claim 7, wherein the very high frequency switching power converter is a Phi2 ($\Phi_2$) class converter configured for very high frequency operation.

12. The apparatus of claim 7, further comprising a baseband signal processor responsive to the input data to provide a baseband signal representing the data as an input to the control circuit.

13. An apparatus, comprising:
a plurality of very high frequency switching power converters, having an respective input for connection to receive power from a power source and as-respective output for connection to a switchable light source, to supply drive current power to cause the switchable light source to emit light on a respective channel,
the each power converter being configured to convert power from the power source to direct current to supply via the output to the switchable light source, at least in part by a switching function of the power converter at a very high frequency rate; and
a control circuit coupled to each power converter and responsive to input data, to control at least one parameter of operation of the plurality of very high frequency power converters on the respective channel and thus current output from each power converter to drive the switchable light source, to switch the current output to drive the switchable light source at a frequency in a range of 30 MHz to 300 MHz and to modulate switched light output from the switchable light source to carry the input data at a rate above 10 Mbps and up to 150 Mbps per channel for light-based over-the-air data communication.

14. The apparatus of claim 13, wherein the switchable light source comprises one or more light emitting diodes each configured to emit light in a narrow spectral band in or near the visible light spectrum.

15. The apparatus of claim 13, wherein the switchable light source comprises one or more light emitting diodes each configured to emit broadband visible light.

16. The apparatus of claim 13, wherein the very high frequency switching power converter is a Phi2 ($\Phi_2$) class converter configured for very high frequency operation.

* * * * *